United States Patent
Meempat et al.

(10) Patent No.: US 11,218,888 B2
(45) Date of Patent: Jan. 4, 2022

(54) APPARATUSES AND METHODS FOR NETWORK RESOURCE DIMENSIONING IN ACCORDANCE WITH DIFFERENTIATED QUALITY OF SERVICE

(71) Applicant: AT&T Intellectual Property I, L.P., Atlanta, GA (US)

(72) Inventors: Gopalakrishnan Meempat, East Brunswick, NJ (US); Huahui Wang, Bridgewater, NJ (US); Ravi Raina, Skillman, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 57 days.

(21) Appl. No.: 16/868,718

(22) Filed: May 7, 2020

(65) Prior Publication Data
US 2021/0352493 A1 Nov. 11, 2021

(51) Int. Cl.
*H04W 24/02* (2009.01)
*H04W 72/04* (2009.01)
(Continued)

(52) U.S. Cl.
CPC .......... *H04W 24/02* (2013.01); *H04W 16/22* (2013.01); *H04W 72/0453* (2013.01); *H04L 43/0876* (2013.01); *H04L 43/16* (2013.01)

(58) Field of Classification Search
CPC . H04L 43/0876; H04L 43/16; H04L 43/0882; H04L 47/24; H04L 47/2408;
(Continued)

(56) References Cited

U.S. PATENT DOCUMENTS

| 8,761,102 B2 | 6/2014 | Puthenpura et al. |
| 2009/0163223 A1* | 6/2009 | Casey ............... H04W 36/22 455/453 |

(Continued)

OTHER PUBLICATIONS

Fayolle, G. et al., "Sharing a Processor Among Many Job Classes", https://www.researchgate.net/publication/234829395, Jul. 1, 1980, 15 pages.
(Continued)

*Primary Examiner* — Nam T Huynh
(74) *Attorney, Agent, or Firm* — Guntin & Gust, PLC; Mark Wilinski

(57) ABSTRACT

Aspects include determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network. Other embodiments are disclosed.

20 Claims, 9 Drawing Sheets

(51) Int. Cl.
*H04W 16/22* (2009.01)
*H04L 12/26* (2006.01)

(58) Field of Classification Search
CPC .... H04L 47/2441; H04W 24/02; H04W 16/18
See application file for complete search history.

(56) References Cited

U.S. PATENT DOCUMENTS

2017/0367081 A1* 12/2017 Cui ................... H04W 28/0231
2018/0070245 A1* 3/2018 Liao ........................ H04L 43/16
2019/0075055 A1* 3/2019 Esserman ................ H04L 47/24
2019/0335342 A1* 10/2019 Jacinto ................. H04W 24/02

OTHER PUBLICATIONS

Shepherd, Paul, "Learn about QoS in 5GG Networks by Paul Shedpherd", Learn about QoS in 5GG Networks by Paul Shedpherd (https://www.awardsolutions.com), http://www.awardsolutions.com/, Jan. 1, 2020, 5 pages.

* cited by examiner

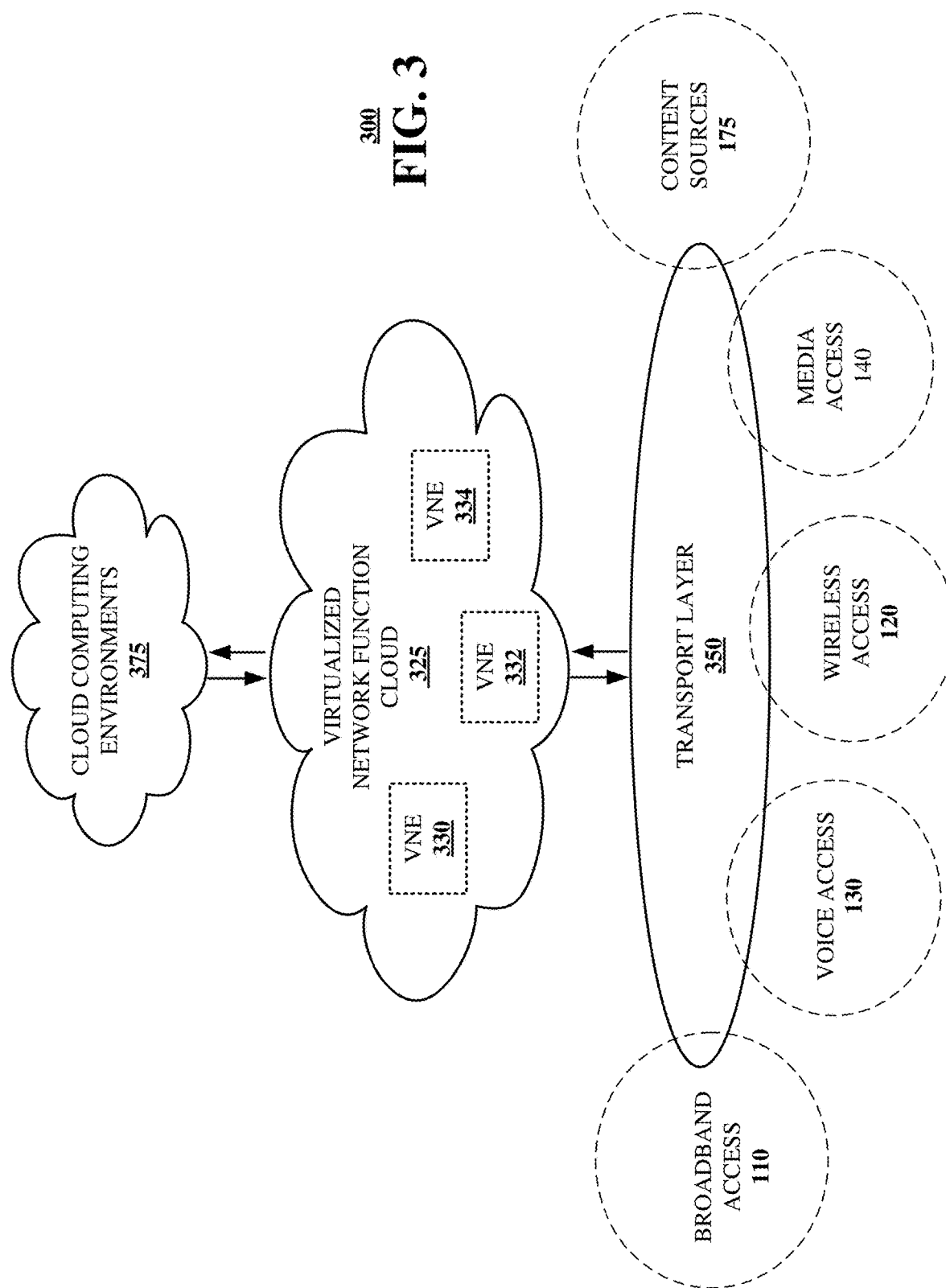

APPARATUSES AND METHODS FOR NETWORK RESOURCE DIMENSIONING IN ACCORDANCE WITH DIFFERENTIATED QUALITY OF SERVICE

FIELD OF THE DISCLOSURE

The subject disclosure relates to apparatuses and methods for network resource dimensioning in accordance with differentiated quality of service (QoS).

BACKGROUND

As the world becomes increasingly connected via vast communication networks and communication devices, additional challenges are created/generated from the perspective of provisioning and managing network resources. For example, from a perspective of a network operator, a policy that favors cost reduction (e.g., cost minimization) while deemphasizing (e.g., disregarding/ignoring) quality of service (QoS) parameters runs a risk of degradation in terms of a user's quality of experience (QoE). The reduction in QoE may tend to alienate/annoy the user, potentially to the point that the user may terminate service with the network operator. On the other hand, a policy that conservatively allocates resources (e.g., spectrum, bandwidth, etc.) to ensure high levels of QoS or QoE, without taking into account fine-grain QoS considerations, runs a risk of wasteful/unnecessary surplus investment.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
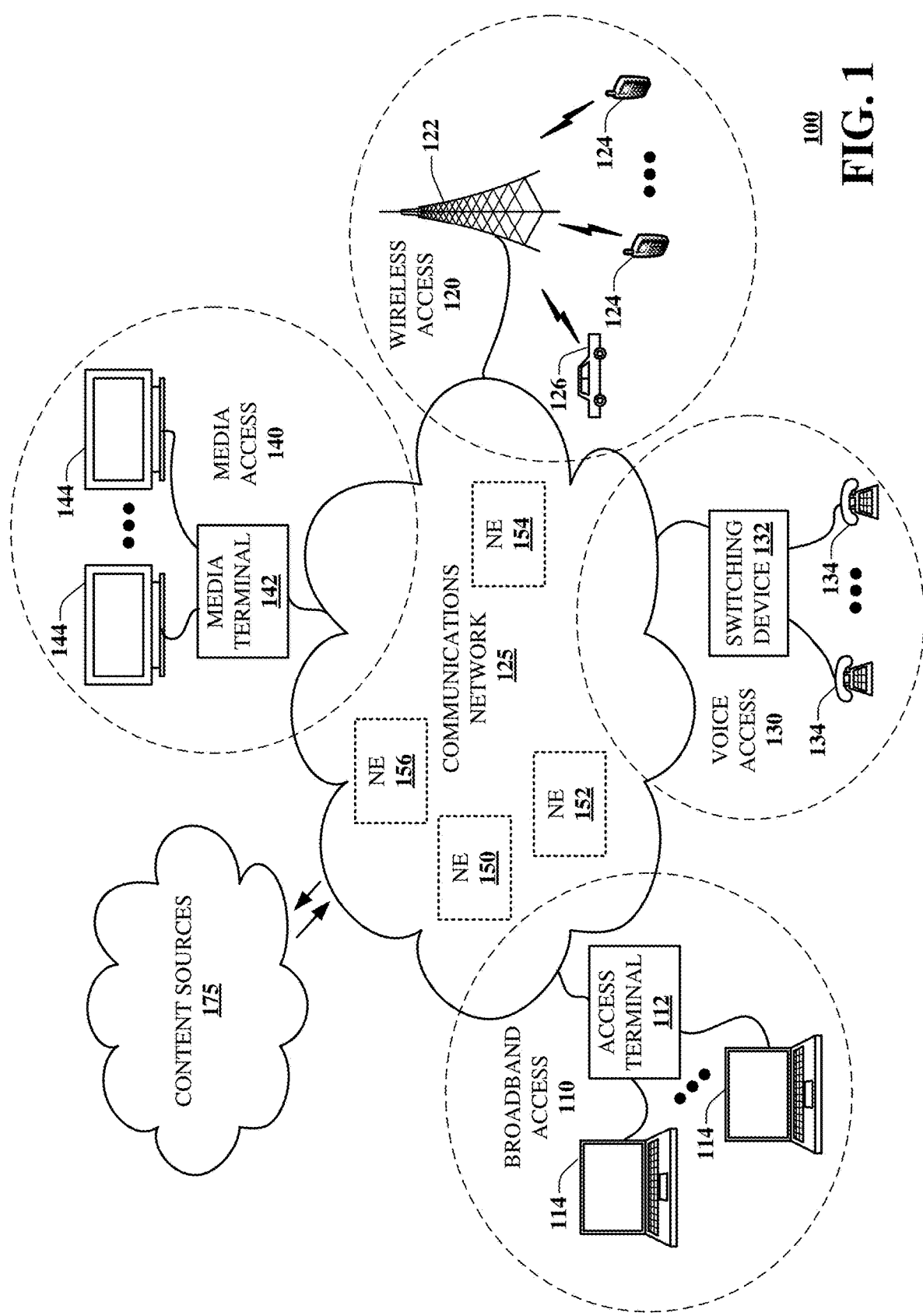
FIG. 1 is a block diagram illustrating an exemplary, non-limiting embodiment of a communications network in accordance with various aspects described herein.

The subject disclosure describes, among other things, illustrative embodiments for allocating or dimensioning resources associated with a communication network in accordance with priority tiers/classes of service. Other embodiments are described in the subject disclosure.

One or more aspects of the subject disclosure include computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells.

One or more aspects of the subject disclosure include responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells.

One or more aspects of the subject disclosure include determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

Referring now to FIG. 1, a block diagram is shown illustrating an example, non-limiting embodiment of a system 100 in accordance with various aspects described herein. For example, system 100 can facilitate in whole or in part computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells. System 100 can facilitate in whole or in part responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells. System 100 can facilitate in whole or in part determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
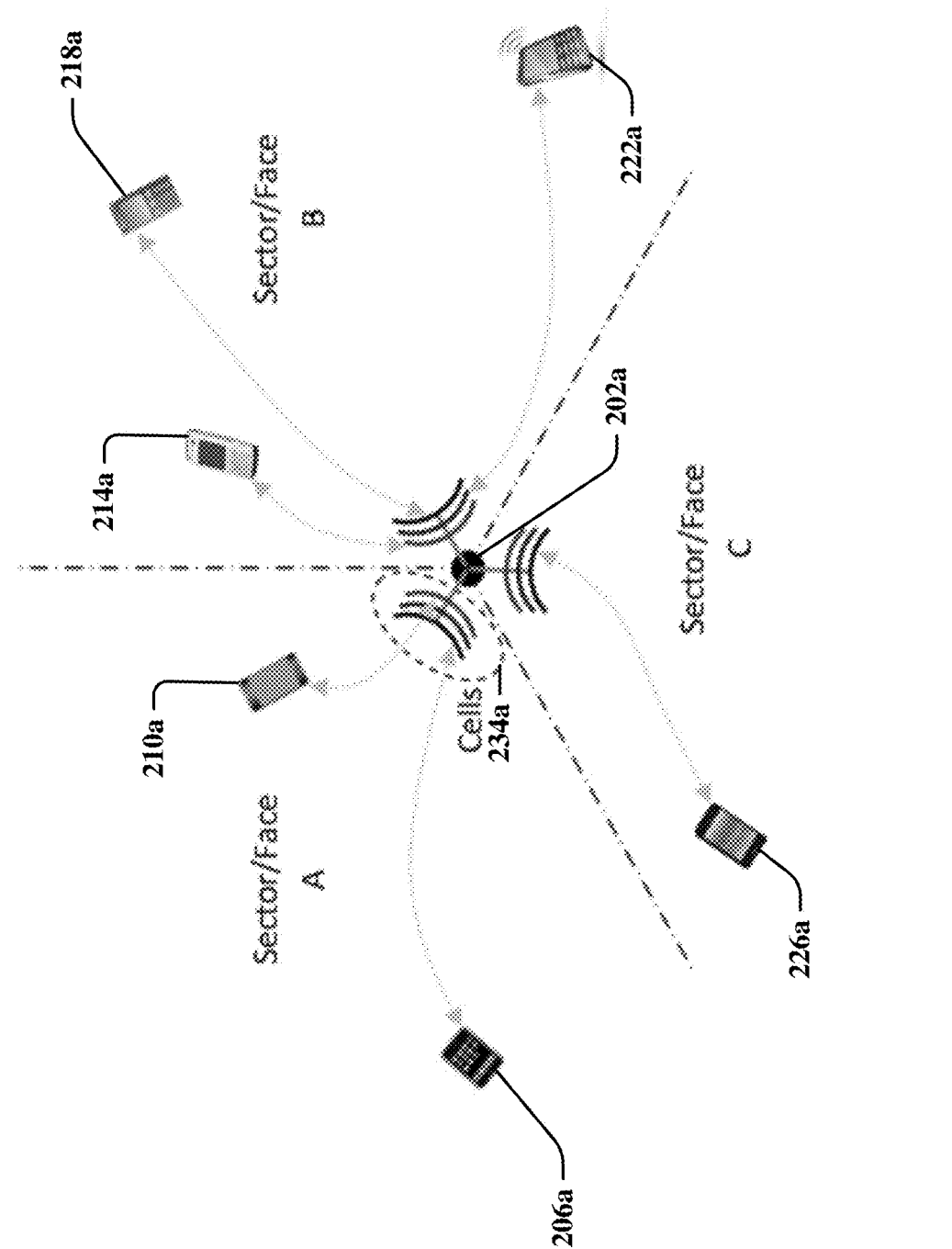
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. In particular, the system 200a may include a tower/base station 202a that may be used to provide service to one or more communication devices, e.g., communication devices 206a, 210a, 214a, 218a, 222a, and 226a. The tower 202a may be communicatively linked/coupled to backhaul infrastructure (not shown in FIG. 2A) via wired and/or wireless connections.

The coverage provided by the tower 202a may be divided into multiple sectors/faces, such as for example three sectors/faces denoted as sector/face A, second/face B, and sector/face C in FIG. 2A. Each of the sectors/faces may be further divided into multiple cells, e.g., cell 234a in FIG. 2A. Each cell within a sector/face may operate at a distinct carrier frequency. The use of multiple carrier frequencies within a sector/face may enhance a data carrying capacity, which in turn may enhance a quality of experience (QoE) or quality of service (QoS).

In the instance of the exemplary system 200a shown in FIG. 2A, the communication devices 206a and 210a may obtain service via the sector/face A, the communication devices 214a-222a may obtain service via the sector/face B, and the communication device 226a may obtain service via the sector/face C. However, one or more of the communication devices 206a-226a may be a mobile device and may migrate from a scope of coverage associated with a first sector/face (e.g., sector/face A) to a scope of coverage associated with a second sector/face (e.g., sector/face B). In this regard, the tower 202a may facilitate a handover of service (e.g., a handover of a communication session) from the first sector/face to the second sector/face. Still further, in some embodiments a handover of service may be provided from the tower 202a to another tower (not shown in FIG. 2A) if a communication device leaves the range of coverage provided by any of the sectors/faces associated with the tower 202a.

Figure 2B:
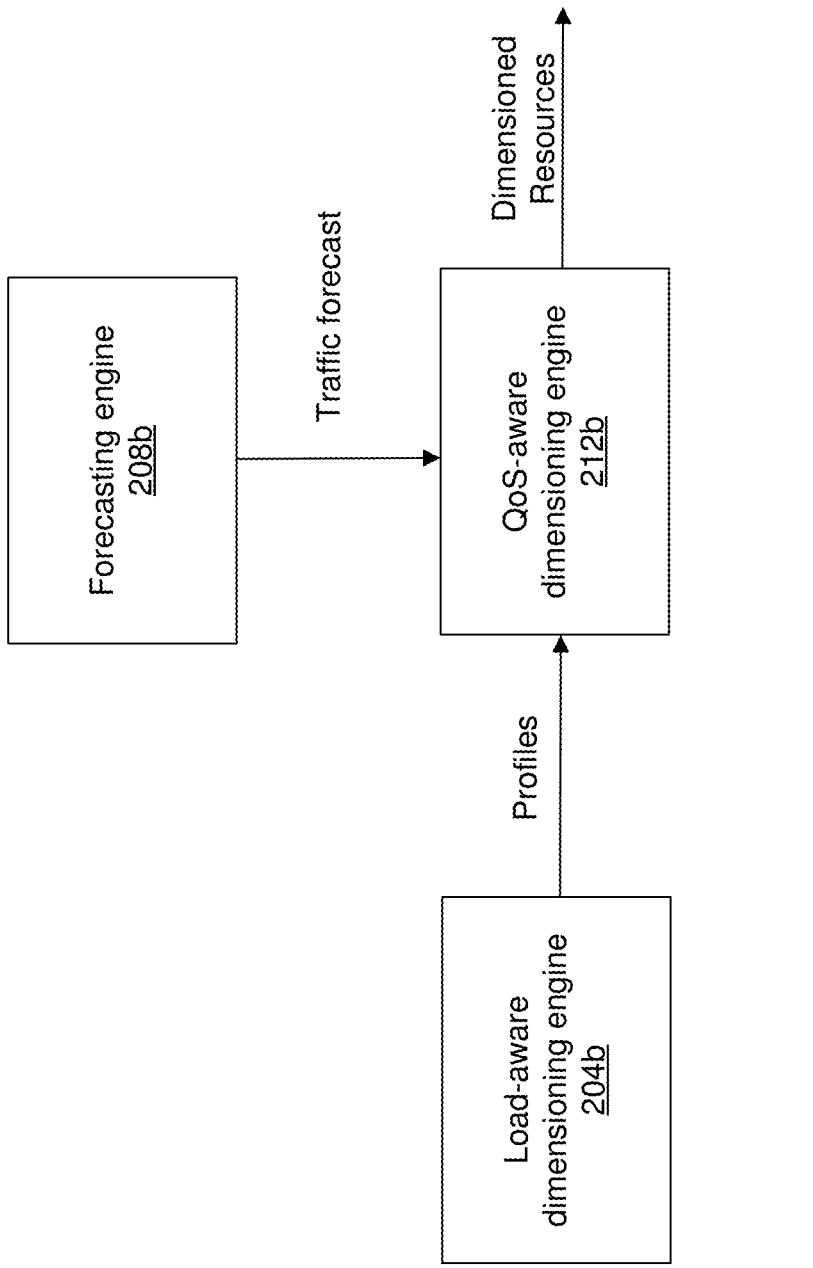
FIG. 2B is a block diagram illustrating an example, non-limiting embodiment of a system functioning within the system of FIG. 2A in accordance with various aspects described herein.

Aspects of the system 200a may be implemented in conjunction with an allocation of resources. To demonstrate, and referring to FIG. 2B, a system 200b is shown that may be used to dimension/allocate resources (e.g., radio resources, communication bandwidth, control resources, etc.) associated with a communication network or system, such as the system 200a of FIG. 2A. The system 200b may include a load-aware dimensioning engine 204b, a forecasting engine 208b, and a QoS-aware dimensioning engine 212b.

The load-aware dimensioning engine 204b may generate profiles for, e.g., each cell of the network or system. The profiles, which may include or be based on various parameters (e.g., signals, interference, noise, etc.), may be specified in an uplink direction, a downlink direction, or both uplink and downlink directions. In some embodiments, one or more of the parameters may be combined in connection with a given profile. For example, in some embodiments the load-aware dimensioning engine 204b may generate a signal-to-interference-plus-noise (SINR) profile for a given cell. The SINR profile may be based at least in part on estimates/projections of one or more communication devices being located within the cell, estimates/projections of one or more communication sessions of the communication device(s) falling within a given SINR class/category, and estimates/projections and/or measurements of throughput within the given SINR class/category. The typical range of possible spectral efficiencies that a random communication device may experience, with reference to a particular cell j, may be segmented into a plurality of bins $m_j$. The spectral efficiency in bin u with reference to cell j may be represented by the bin-specific spectral efficiency parameter $\theta_{j,u}$. Aspects of past records (e.g., past drive test records) may drive values for $p_{j,u}$, which denotes the probability that a random communication device attached to cell j will find itself in bin u.

The forecasting engine 208b may generate forecasts of traffic in the network or system. The forecasts may be based on traffic projections at a given level of granularity. In some embodiments, the generation of the forecasts may take into considerations of a type of traffic (e.g., voice and video), and elasticity in terms of data volume at different priority levels/classes.

The QoS-aware dimensioning engine 212b may be operative on the outputs of the load-aware dimensioning engine 204b and the forecasting engine 208b to provide/generate dimensioned resource allocations. The generation of such resource allocations by, e.g., the QoS-aware dimensioning engine 212b is described in further detail below in connection with, e.g., the method 200c of FIG. 2C. Aspects of the method 200c may be executed/implemented in conjunction with, or with respect to, an uplink direction, a downlink direction, or a combination thereof.

For purposes of illustration, it may be assumed that a particular sector/face of a system (e.g., system 200a of FIG. 2A) initially has a total of $\Psi$ carriers or cells, where each of the carriers/cells is arranged in a predetermined order of deployment, and each of the carriers/cells is indexed as $j=1, \ldots, \Psi$. Further, it may be assumed that the cells corresponding to $j=1$ through $j=\Psi-1$ are at their highest subscription level, and cell $j=\Psi$ may be at any one of its intermediate subscription levels (e.g., a subscription level that is less than, or equal to, a subscription capacity maximum for the cell). Still further, each carrier/cell j may initially have a provisioned spectrum $B_j$. Moreover, each carrier/cell j may have an associated spectral efficiency. The average spectral efficiency for the $j^{th}$ carrier/cell, denoted as $\theta_j$, may be calculated as follows:

$$\theta_j = [\Sigma u(p_{j,u}/\theta_{j,u})]^{-1},$$

where $p_{j,u}$ denotes the probability of a communication session of a communication device falling within an SINR bin u of cell j for an arbitrary number of bins m (e.g., u=0, ..., m−1), and $\theta_{j,u}$ denotes the spectral efficiency in bin u ($\{p_{j,u}, \theta_{j,u}\}$ are assumed to be available beforehand from drive test data).

In the description that follows, it is assumed that there are two guaranteed traffic classes (corresponding to k=0 and k=1), where the guaranteed traffic classes correspond to: (1) conversational voice (k=0), e.g., voice over LTE protocol [VoLTE] supported at QCI priority level 1 in LTE networks, and (2) conversational video (k=1), e.g., live streaming supported at QCI priority level 2 in LTE networks. Still further, it is assumed that there are four elastic data classes (corresponding to k=2 through k=5). The elastic data classes (k=2 through k=5) each may correspond to/include any combination of buffered video, email, text (documents, chat), file transfers, peer-to-peer file sharing, progressive video, and interactive gaming; e.g., the four data traffic classes supported at QCI priority levels 6-9 in LTE networks. One skilled in the art would appreciate that these assumptions may be relaxed in a given embodiment to provide for more or less guaranteed traffic classes and/or more or less elastic data classes.

With the foregoing assumptions in place, in block 202c a cell capacity for each of the Ψ cells, $C_j$, j=1, ..., Ψ, may be computed. The capacity of the $j^{th}$ cell, $C_j$, may be computed as the product of the spectrum configured for the cell ($B_j$) and the spectral efficiency of the cell ($\theta_j$), e.g.:

$$C_j = B_j * \theta_j$$

In block 206c, a determination may be made whether the traffic utilization associated with the guaranteed traffic classes (e.g., conversational voice (k=0) and conversational video (k=1) in accordance with the foregoing assumptions) exceeds a threshold $R_{max}$, where $R_{max}$ represents the maximum fraction of the available capacity allowed for the guaranteed traffic. If the guaranteed traffic utilization does not exceed the threshold ($R_{max}$), flow may proceed from block 206c to block 210; otherwise, flow may proceed from block 206c to block 230c.

In block 210c, erlangs associated with the guaranteed traffic classes may be apportioned. For example, and in accordance with projections/estimates regarding demand, $E_0$ may denote the erlangs for conversational voice (k=0) and $E_1$ may denote the erlangs for conversational video (k=1). As part of block 210c, the elastic data volume of the sector/face (denoted as EDV) may be apportioned to each of the cells j in an amount $EDV_j$ that is in proportion to the capacity of the cell ($C_j$) relative to the total capacity ($\Sigma_q C_q$), e.g.:

$$EDV_j = EDV * (C_j)/(\Sigma_q C_q),$$

where the summation operator (Σ) is applied for all cells 'q' from 1 through Ψ. In some embodiments, the apportioning for $E_0$ and $E_1$ may use the same, or a similar, scaling as set forth above for the elastic data volume.

In block 214c, the elastic data capacity ($D_j$) for elastic data traffic (e.g., k=2 through k=5 in the foregoing description) for each of the j cells may be computed as the difference between the capacity of the cell ($C_j$) and the capacity allocated to the guaranteed traffic classes (k=0 and k=1 in the foregoing description). In other words, the elastic data capacity may be computed as:

$$D_j = C_j - ([E_{j,0} * b_0] + [E_{j,1} * b_1]),$$

where $E_{j,0}$ denotes the apportioned erlangs for the $j^{th}$ cell associated with the first guaranteed traffic class (e.g., k=0), $E_{j,1}$ denotes the erlangs for the $j^{th}$ cell associated with the second guaranteed traffic class (e.g., k=1), $b_0$ denotes the bandwidth occupied by each session of the first guaranteed traffic class, and $b_1$ denotes the bandwidth occupied by each session of the second guaranteed traffic class.

In block 218c, and as described in further detail below, analytical modeling and/or simulation may be performed based on the elastic data capacity computed in block 214c to determine/compute throughput $T_{j,k}$ for each cell j and each of the elastic data classes (k=2 through k=5 in this example).

The choice of whether to perform analytical modeling or simulation as part of block 218c may be based on one or more considerations. An apportioning of traffic volumes among the cells (i.e., load balancing) may be common to both analytical modeling and simulation, and both may be used to compute performance (e.g., throughput) in an individual cell (post load balancing). However, different tradeoffs may be present between execution speed and granularity of results. For example, analytical modeling may be fast but might only provide an average of throughput estimates. Conversely, simulation may tend to be slow, but may provide greater flexibility and may provide more refined metrics such as a cumulative distribution function (CDF) of throughputs.

In block 222c, a determination may be made whether the throughputs computed in block 218c all satisfy a threshold, denoted as $S_{min}(k)$. For example, each of the classes (k=2 through k=5) may have its own threshold (e.g., $S_{min,k}$) as part of block 222c.

If the determination of block 222c is answered in the affirmative, flow may proceed from block 222c to block 226c. Otherwise, flow may proceed from block 222c to block 230c.

In block 226c, the count of cells may be updated to correspond to the last count of cells. As described above, initially the count of cells may be set equal to Ψ; however, execution of the method 200c (e.g., block 234c described below) may result in a count that is different from Ψ. As part of block 226c, the spectrum that is allocated to a given cell (e.g., the cell corresponding to j=Ψ) may be updated to correspond to the last spectrum allocation to that cell. For example, execution of block 234c or block 238c described below may result in a new/different spectrum allocation.

In block 230c, a determination may be made whether the last cell (e.g., the cell corresponding to j=Ψ) is at a threshold (e.g., maximal) spectrum allocation. If so, flow may proceed from block 230c to block 234c. Otherwise, flow may proceed from block 230c to block 238c.

In block 234c, a new cell (e.g., a cell corresponding to j=Ψ+1) may be deployed at a predetermined (e.g., a minimum, discrete) spectrum level. From block 234c, flow may proceed to block 202c to facilitate additional (e.g., continued or periodic) executions of the method 200c.

In block 238c, the spectrum associated with the last cell (e.g., j=Ψ) may be increased (e.g., incremented) to the next available level. From block 238c, flow may proceed to block 202c to facilitate additional (e.g., continued or periodic) executions of the method 200c.

As described above in relation to block 218c, in some embodiments analytical modeling may be utilized to compute the throughput ($T_{j,k}$) for each elastic data class (k=2 through k=5 in the given example) for each cell (initially, j=1 through j=Ψ). For a given cell j, the analytical modeling may be based on the elastic data volume apportioned to the cell ($EDV_j$) as computed/determined in block 210c and the elastic data capacity ($D_j$) computed/determined in block 214c. In particular, and with reference to G. Fayolle et al., "Sharing a Processor Among Many Job Classes", Journal of the ACM, Vol. 27, No. 3, July 1980, pp. 519-532, the contents of which are incorporated herein by way of reference, equations described therein (hereinafter referred to as the Fayolle equations) may be utilized/solved to compute the throughputs ($T_{j,k}$) as part of block 218c. To demonstrate, and for the elastic data classes (k=2 through k=5 in this example), and assuming a set of scheduler priority weights $w_k$ for k=2 through k=5, the following system of Fayolle equations may be computed/solved to ultimately obtain the throughputs ($T_{j,k}$):

$$x_{j,k} * [1 - \Sigma_r((Q_{j,r} * w_r)/(w_r + w_k))] - [\Sigma_r((Q_{j,r} * w_r) * x_{j,r}/(w_r + w_k))] = 1/D_j,$$

where $Q_{j,r} = EDV_{j,r}/D_j$ and denotes the class 'r' resource block utilization within cell j, and the summation operators ($\Sigma_r$) are applied over the total number of elastic data priority classes (e.g., r=2 through r=5 in this example). In particular, the Fayolle equations may be solved to determine values for the variables $x_{j,k}$. Once the values $x_{j,k}$ are known/computed, the throughputs ($T_{j,k}$) may be computed as the inverse of those values, e.g.:

$$T_{j,k} = 1/x_{j,k}$$

As described above in relation to block 218c, in some embodiments simulation may be utilized to compute the throughput ($T_{j,k}$) for each elastic data class (k=2 through k=5 in the given example) for each cell (initially, j=1 through j=Ψ). Within the simulation, a Markovian birth-death queuing framework may be adopted/incorporated. Each of the guaranteed traffic classes (k=0 and k=1 in the foregoing description) may have an exponentially distributed random holding time with a fixed average denoted as $H_k$; e.g., for the first guaranteed traffic class the average holding time may be assumed to be $H_0$ and for the second guaranteed traffic class the average holding time may be assumed to be $H_1$. As used herein, a holding time may be assumed to be approximately equal to an amount of time that a resource is utilized/consumed as part of a communication session associated with a given traffic class. Each of the elastic data classes (e.g., k=2 through k=5 in the foregoing description) may have associated transactions, where each transaction includes an exponentially distributed average payload pldk. Inter-arrival times of guaranteed traffic class transactions (i.e., voice/video calls) and elastic data traffic class transactions may be modeled as exponentially distributed random variables. Time-based epochs may be defined by one or more events, such as for example an arrival (e.g., a start) of a session associated with a guaranteed traffic class (e.g., k=0 and k=1 in the foregoing examples), an arrival of a session associated with an elastic data class (e.g., k=2 through k=5 in the foregoing examples), a departure (e.g., a termination) of a session associated with a guaranteed traffic class, and a departure of a session associated with an elastic data class.

With the foregoing assumptions in place as part of the simulation, a state of the system or network may be captured in a vector of the form $n_{k,u}$, where $n_{k,u}$ denotes the number of active sessions belonging to QoS/priority class k and SINR bin u (for u=0 to u=m−1). Upon arrival/start of a session, the corresponding SINR class (u) may be chosen at random per a probability mass distribution {$p_u$} (estimated beforehand from drive test data).

Figure 2C:
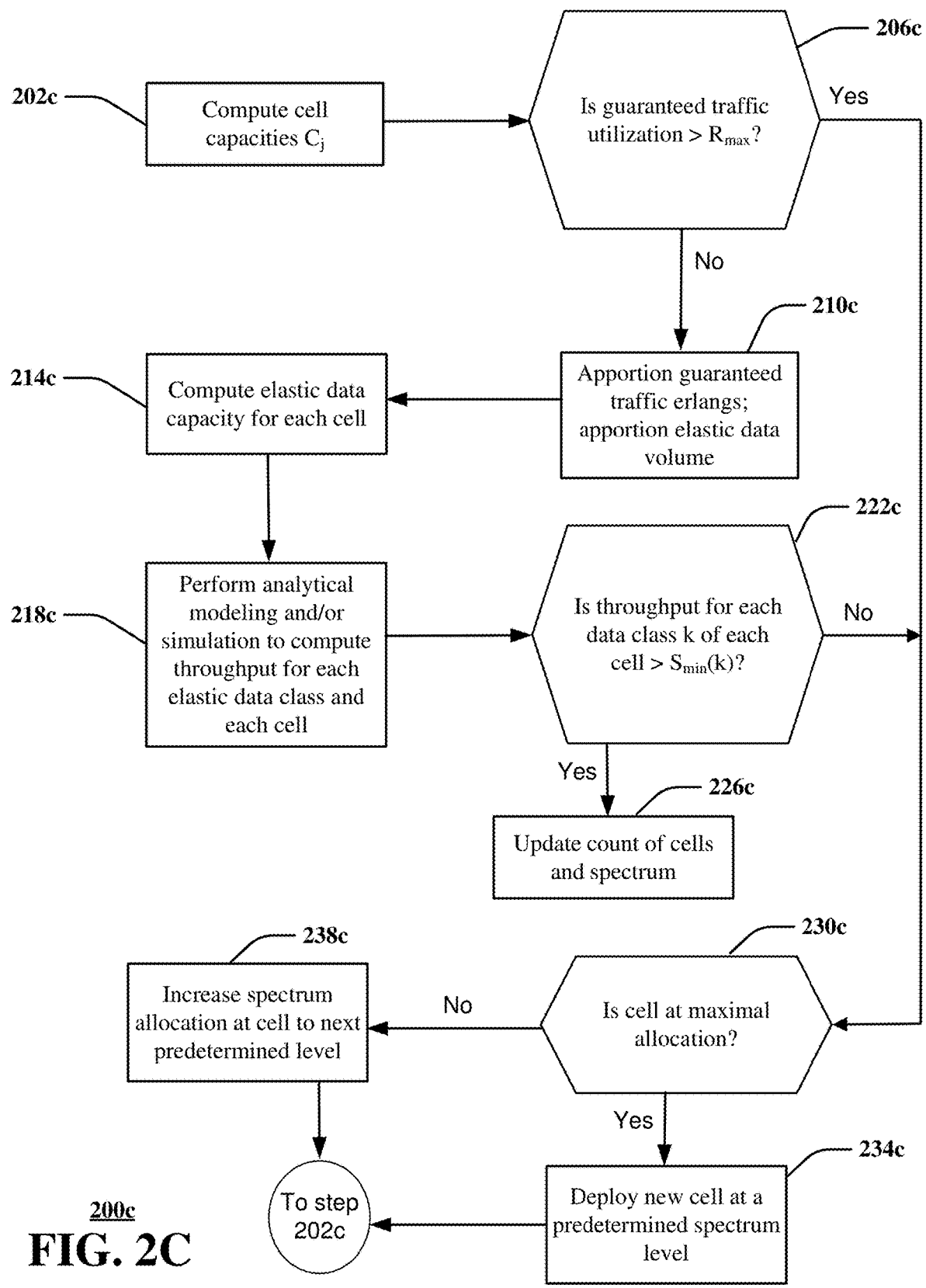
FIG. 2C depicts an illustrative embodiment of a method for allocating cells and spectrum in accordance with various aspects described herein.
Figure 2D:
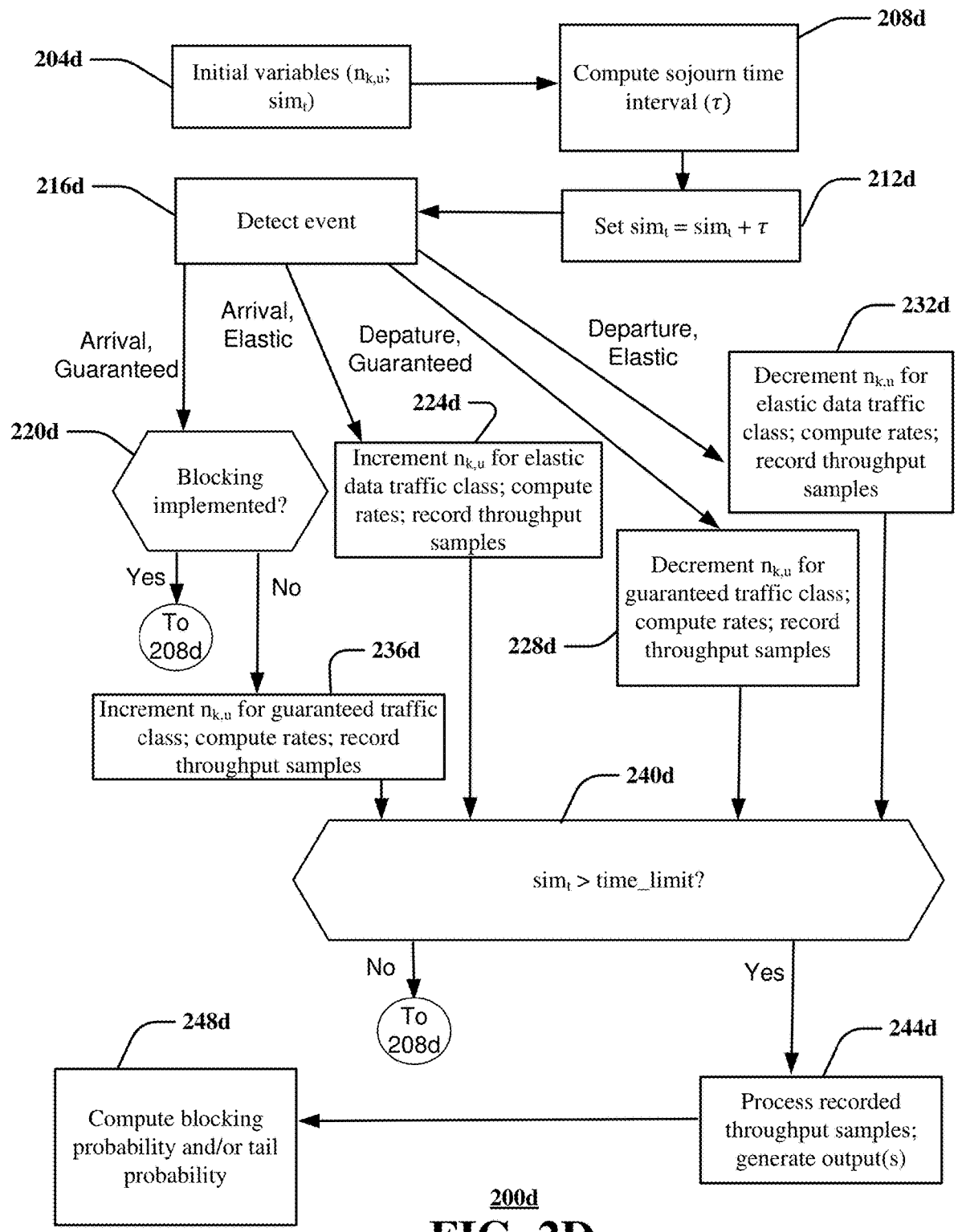
FIG. 2D depicts an illustrative embodiment of a method for performing/engaging a simulation in accordance with various aspects described herein.

Referring now to the method 200d of FIG. 2D, in block 204d parameters/variables of the method may be initialized. For example, as part of block 204d, the state vector ($n_{k,u}$) may be initialized to zero and a simulation time ($sim_t$) may be set equal to zero. Furthermore, the spectrum share available for elastic data, BD, is set equal to B, the total spectrum configured at the cell.

In block 208d, a sojourn time interval (τ) may be computed. The sojourn time interval (τ) may be modeled as an exponentially distributed random variable, in accordance with a state exit rate that is equal to the sum of arrival and departure rates (known whenever this block is entered) as described in further detail below. At the start of simulation (or following an epoch when the system becomes empty) there are no pending transactions (i.e., $n_{k,u}$=0∀k, u); hence the net departure rate is 0. The exponentially distributed sojourn time τ in this situation is determined in block 204d as the sum of only the (known) arrival rates from all traffic classes. Transaction arrival rates for voice and video (k=0,1) equal the respective projected Erlangs divided by the respective holding times, and those for each of the elastic data classes (k=2, . . . , 5) equals the respective projected traffic volume divided by an assumed payload size per transaction x (a specified system constant, e.g., x=1 Mbits). In the more general situation where there are pending transactions, computation of the non-zero departure rates to be included is state-dependent, hence more complex, and will be described in further detail in the sequel.

In block 212d, the simulation time ($sim_t$) may be set equal to the sum of the current or last value of the simulation time ($sim_t$) and the sojourn interval (τ)—advancement of the simulated virtual time.

In block 216d, a specific coarse event (i.e., an arrival or a departure) may be differentiated, via pseudo-random coin toss based on the logic that the probability of that event (arrival/departure) equals the exit rate into that event (from the preceding state) divided by the total exit rate from the preceding state. For example, at the top level of hierarchy, the average sojourn time equals 1/(arrival rate+departure rate), prob(next event being arrival)=arrival rate/(arrival rate+departure rate) and prob(next event being departure)=departure rate/(arrival rate+departure rate). If the event is an arrival associated with a guaranteed traffic class, flow may proceed from block 216d to block 220d. If the event is an arrival associated with an elastic data traffic class, flow may proceed from block 216d to block 224d. If the event is a departure associated with a guaranteed traffic class, flow may proceed from block 216d to block 228d. If the event is a departure associated with an elastic traffic class, flow may proceed from block 216d to block 232d. Note that finer-grain differentiation among guaranteed or elastic arrivals and guaranteed or elastic class departures is again carried out based on pseudo-random coin tosses driven by ratios of the (known) entrance rates, analogously as described above for coarse event differentiation.

In block 220d, a determination may be made whether call blocking is implemented (either broadly speaking, or with respect to the particular arrival identified in block 216d. Blocking may entail effectively discarding/ignoring/dropping the arrival (as identified in block 216d) if it meets one of a set of blocking criteria—e.g., if the current total voice and video occupancy in the system exceeds an allowed threshold, or by virtue of a junk/spam filter that blocks incoming arrivals from particular phone numbers or communication devices. If the incoming arrival is blocked, flow may proceed from block 220d to block 208d. Otherwise the arrival is accepted, and flow may proceed from block 220d to block 236d.

In block 236d, the state vector ($n_{k,u}$, k=0,1) may be incremented in accordance with the guaranteed traffic class arrival (of block 216d), thereby increasing the resource/capacity utilization for guaranteed traffic and effectively decreasing the resources/capacity available for elastic data. Fine grain identification of a specific guaranteed class among k=0,1, is carried out based on the pseudo-random coin toss logic driven by ratios of exit rates, described above for event classification at the higher levels of hierarchy. Next, fine grain identification of a specific SINR bin u is carried out via pseudo-random coin toss logic driven by the known probabilities of a transaction falling in various SINR bins (i.e., $\{p_{k,u}\}$). The aforementioned logic is analogously applicable to the description set forth below as well. To enable computation of the next sojourn time $\tau$ in block 216*d* and the following event resolutions as described above, the departure rate from the current state is now updated by adding the inverse of the call holding time. Furthermore, the spectrum budget available to data BD is decreased by $b_k/\theta_{.,u}$, where $b_k$ denotes the payload bandwidth occupied by the arriving guaranteed transaction (of priority class k=0,1) and $\theta_{.,u}$ denotes the spectral efficiency achieved in the SINR bin u for the cell in consideration, where the arrival landed.

In block 224*d*, the state occupancy ($n_{k,u}$, k=2, . . . , 5) may be incremented in accordance with the elastic data traffic class arrival (of block 216*d*). User throughputs as well as exit rates for all data states (i.e., $\{(k, u), k=2, \ldots, 5\}$ may need to be updated concurrently in block 224*d*, since (unlike in the case of guaranteed transactions), they are interrelated for elastic data transactions. The complex procedure for this step is detailed further below.

In block 228*d*, the state occupancy ($n_{k,u}$, k=0, 1) may be decremented in accordance with the guaranteed traffic class departure (of block 216*d*), thereby decreasing the resource/capacity utilization for guaranteed traffic and effectively increasing the resources/capacity available for elastic data. In particular, the spectrum budget available to data BD is decreased by $b_k/\theta_{.,u}$ where $b_k$ denotes the payload bandwidth occupied by the departing guaranteed transaction (of priority class k=0,1) and $\theta_{.,u}$ denotes the spectral efficiency achieved in the SINR bin u for the cell in question, where the departing transaction belonged. Also, the departure rate from this state is updated by subtracting the inverse of the call holding time.

In block 232*d*, the state occupancy ($n_{k,u}$, k=2, . . . , 5) may be decremented in accordance with the elastic data traffic class departure (of block 216*d*). User throughputs as well as exit rates for all components of the state vector for data (i.e., $\{n_{k,u}, k=2, \ldots, 5\}$ may need to be updated concurrently in block 232*d*, since (unlike in the case of guaranteed transactions), they are interrelated for elastic data transactions. The complex procedure for this step is detailed further below.

As part of each of blocks 236*d*, 224*d*, 228*d*, and 232*d*, guaranteed traffic class and elastic data traffic class session arrival or departure rates may be updated/captured, as applicable, based on the nature of the event identified in block 216*d*. For example, for a given class of the guaranteed traffic classes, session arrival rates (see block 236*d*) may be computed as the erlangs for the given class divided by the holding time for the class. For a given class of the guaranteed traffic classes, session departure rates (see block 228*d*) may be computed as the number of active sessions for the given class divided by the hold time for the class. Following the arrival/departure of a guaranteed class transaction, the spectrum share available for elastic data, BD, may be decreased/increased by an amount equal to the bandwidth occupancy of the transaction divided by the spectrum efficiency enjoyed by the transaction. For a given class of the elastic data traffic classes, session arrival rates (see block 224*d*) may be computed as the respective volume of data per unit time (as illustratively measured in Megabits per second [Mbps]) divided by the data payload size of the session/transaction x (e.g., x=1 Mbits). Departure rates for sessions of the elastic data traffic classes (see block 232*d*) may be interrelated to each other and to the number of transactions associated with the guaranteed traffic classes, and may be modeled/computed in accordance with scheduling priority rules.

To determine the update rules applicable for each elastic data class state (k, u), with, k=2, . . . ,5 being the traffic class and u being the SINR bin, the procedure may be as follows. Per the weighted proportionate-fairness scheduling policy assumed to be in place within the cell schedulers, the current spectrum share of each active transaction in this state may be given by $s_k = BD \times w_k/(\Sigma_l \Sigma_m w_l n_{l,m})$, the summation in the denominator being across all data states (i.e., l=2, . . . ,5), where BD denotes the currently available aggregate data spectrum share, $w_l$ denotes the scheduler weight assigned to elastic priority class l and $n_{l,m}$ denotes the number of currently ongoing transactions in elastic state (l, m). Next, the current user throughput enjoyed by each active transaction in state (k, u) is given by $T_{k,u} = s_k \times \theta_{.,u}$ where $\theta_{.,u}$ denotes the spectrum efficiency achievable in SINR bin u for the cell in question, as recorded in advance from drive test data. Finally, the departure rate from state (k, u) is given by $n_{k,u} \times T_{k,u}/x$. Note that these steps may need to be carried out for all states upon each arrival to/departure from any of the elastic data or guaranteed states. The procedure may be simpler when a guaranteed transaction arrival/departure occurs—only BD may need to be scaled in the above equations.

As part of each of blocks 236*d*, 224*d*, 228*d*, and 232*d*, aggregate state exit rates may be computed to facilitate the sojourn time computation and event resolution (based on pseudo-random tosses aided by ratios of rates). For example, the (total) state exit rate may be computed as the sum of all session/transaction arrival rates and the session/transaction departure rates described above. The state exit rate may be used to determine the sojourn time interval ($\tau$) as described above in connection with block 208*d*.

As part of each of blocks 236*d*, 224*d*, 228*d*, and 232*d*, samples of throughput ($T_{k,u}$) may be recorded for a communication device for each k and u, where applicable, with a statistical probability weighting applied thereto. In some embodiments, the probability weighting may be based on (a product of) the state vector ($n_{k,u}$) and the sojourn time interval ($\tau$).

In block 240*d*, a determination may be made whether the simulation time ($sim_t$) exceeds a threshold (time_limit). If not, flow may proceed from block 240*d* to block 208*d*; otherwise, flow may proceed from block 240*d* to block 244*d*. The threshold (time_limit) of block 240*d* may be based on experimentation and may be selected to ensure accuracy/convergence is obtained, while at the same time avoiding excessive delay (e.g., delay in an amount greater than a threshold) in generating simulation outputs/results described below.

In block 244*d*, the (probability weighted) recorded throughput values/samples obtained as part of blocks 236*d*, 224*d*, 228*d*, and 232*d* may be processed, potentially as part of generating one or more outputs (e.g., reports, displays, audio renderings/presentations, etc.). The processing of block 244*d* may include the application of one or more filters to reduce the impact of spurious values/samples.

In block 248*d*, a blocking probability for guaranteed traffic classes may be computed and/or a tail probability for the data (e.g., the recorded throughput values, as subject to any probability weighting) may be computed. The computations of block 248*d* may be used as part of additional/future executions of the method 200*c* and/or the method 200*d* (e.g., may be used as a filter or prediction of a likelihood of an event—e.g., a blocking—occurring, which may be used to modify resource allocations potentially as part of one or more weightings). The computations of block 248d may provide an indication of a degree of confidence in the outputs of block 244d, which may serve as a further refinement in relation to resource allocations.

In some embodiments, the determination of the event type in block 216d may adhere/conform to three hierarchical steps. In a first of the steps, a coarse resolution may be performed to identify the event as among one of: (a) an arrival, (b) a first guaranteed traffic class departure, (c) a second guaranteed traffic class departure, and (d) an elastic data traffic class departure. In a second of the steps, if the event is: an arrival (a), then a one-step array lookup may be used to resolve its QoS and SINR class (i.e., the computational steps of block 216d may be replaced by an associative array lookup at fine granularity, to speed up execution); if it is a departure involving a guaranteed traffic class ((b) or (c)), then a resolution of the SINR class may be performed; if it is an elastic data traffic class departure (d), then a resolution of the QoS class may be performed. In a third of the steps, if the event is a departure involving a certain QoS class (as determined in the second step) of an elastic data traffic class (as determined in the first step), then a resolution of the SINR class may be performed.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

According to aspects of this disclosure, a QoS-based approach may be utilized as part of dimensioning/allocating resources (e.g., wireless spectrum) for a network. Such allocations may be based on a progressive search/query for the required number of cells and cell bandwidth assignments that may meet/satisfy stability and target performance criteria. In various embodiments, a sector/face load may be split among multiple cells in accordance with load-balancing policies. A scheduling policy may allocate resources in accordance with weights assigned to elastic data traffic classes.

Aspects of this disclosure provide analytical modeling and simulation as techniques for estimating performance in conjunction with resource allocations. Analytical modeling may enable dimensioning/allocations based on average throughput criteria. Simulation may be used to enable dimensioning/allocations based on more refined tail probability throughput criteria.

As described herein, aspects of this disclosure provide for resource (e.g., wireless spectrum) dimensioning/allocations subject to meeting differentiated QoS targets among multiple types of traffic classes. As set forth herein, VoIP, (conversational) video, and elastic data are examples of QoS traffic classes that may be used. Other forms/types of traffic classifications may be included/utilized in some embodiments.

As set forth above, additional carriers/cells may be allocated within a given sector/face in response to changes (e.g., increases) in demand. Accordingly, aspects of this disclosure may reduce (e.g., minimize) inter-sector interference by only using/allocating carriers/cells that are needed to meet QoS demands/requirements.

Aspects of this disclosure may incorporate SINR profiles, traffic demand measurements and estimates, performance criteria, and scheduling and load balancing policies as part of generating resource (e.g., spectrum, carrier frequency, bandwidth, etc.) allocations in a network.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200a and 200b, and methods 200c and 200d presented in FIG. 1 and FIGS. 2A-2D. For example, virtualized communication network 300 can facilitate in whole or in part computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells. Virtualized communication network 300 can facilitate in whole or in part responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells. Virtualized communication network 300 can facilitate in whole or in part determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
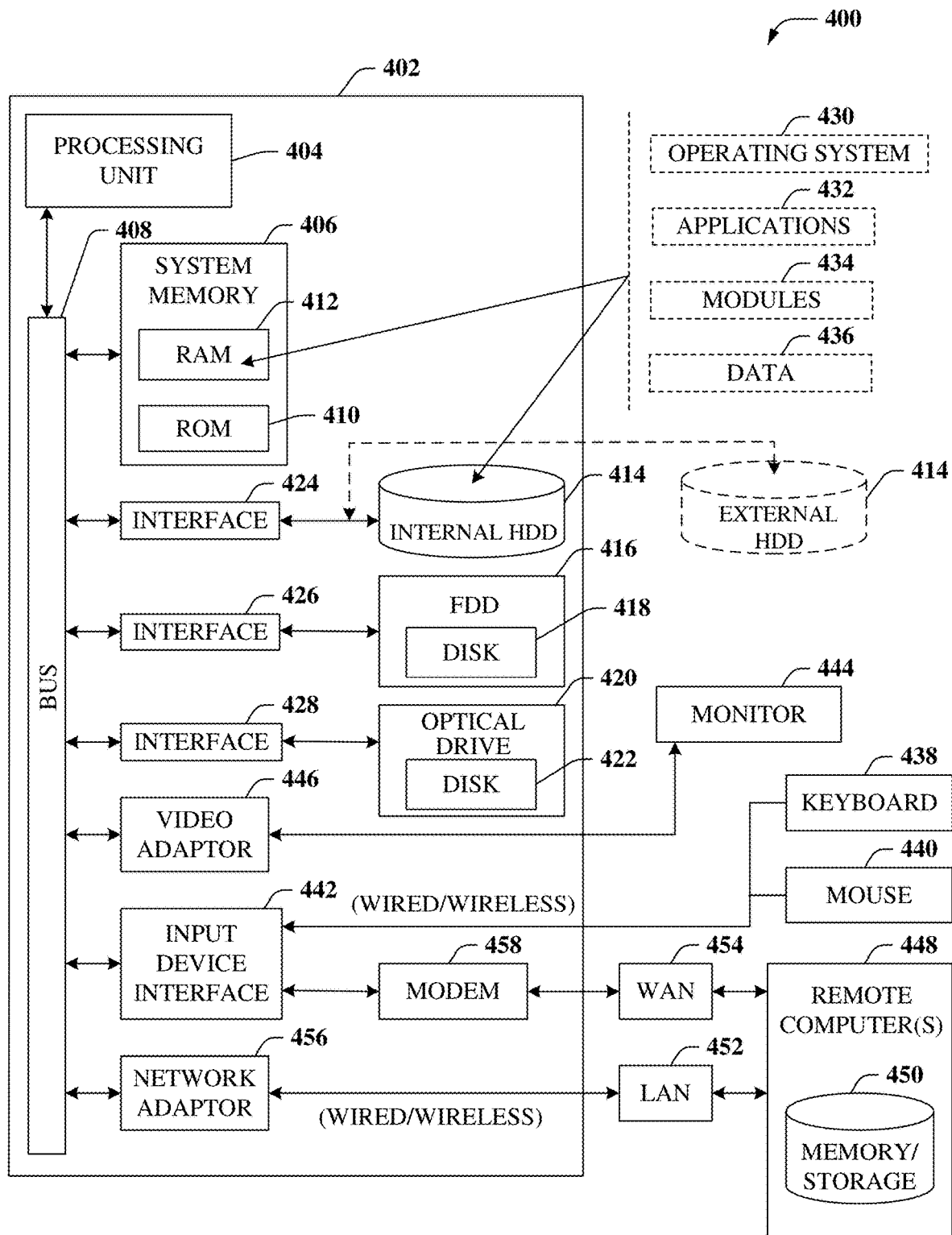
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells. Computing environment 400 can facilitate in whole or in part responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells. Computing environment 400 can facilitate in whole or in part determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
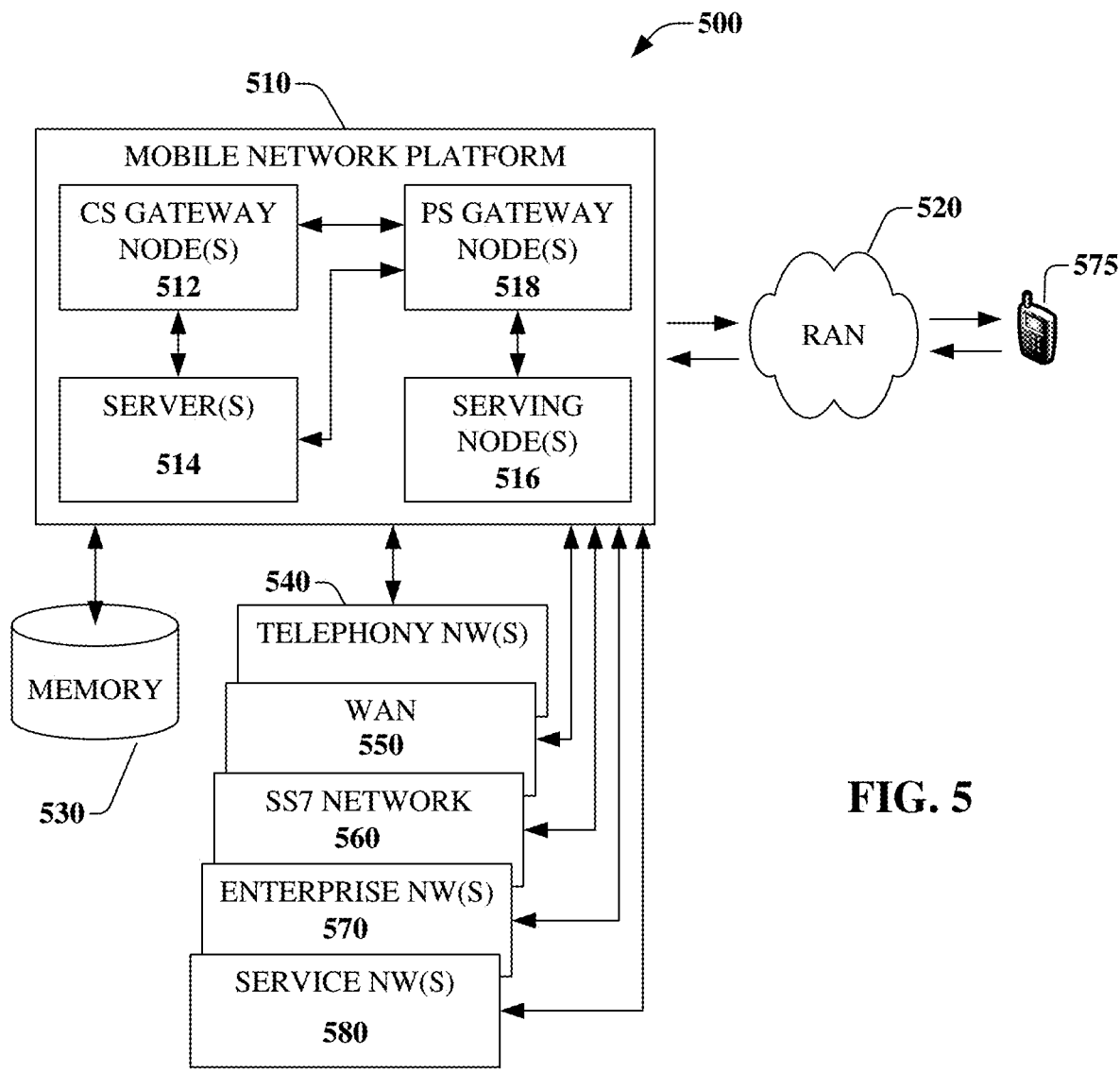
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells. Platform 510 can facilitate in whole or in part responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells. Platform 510 can facilitate in whole or in part determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
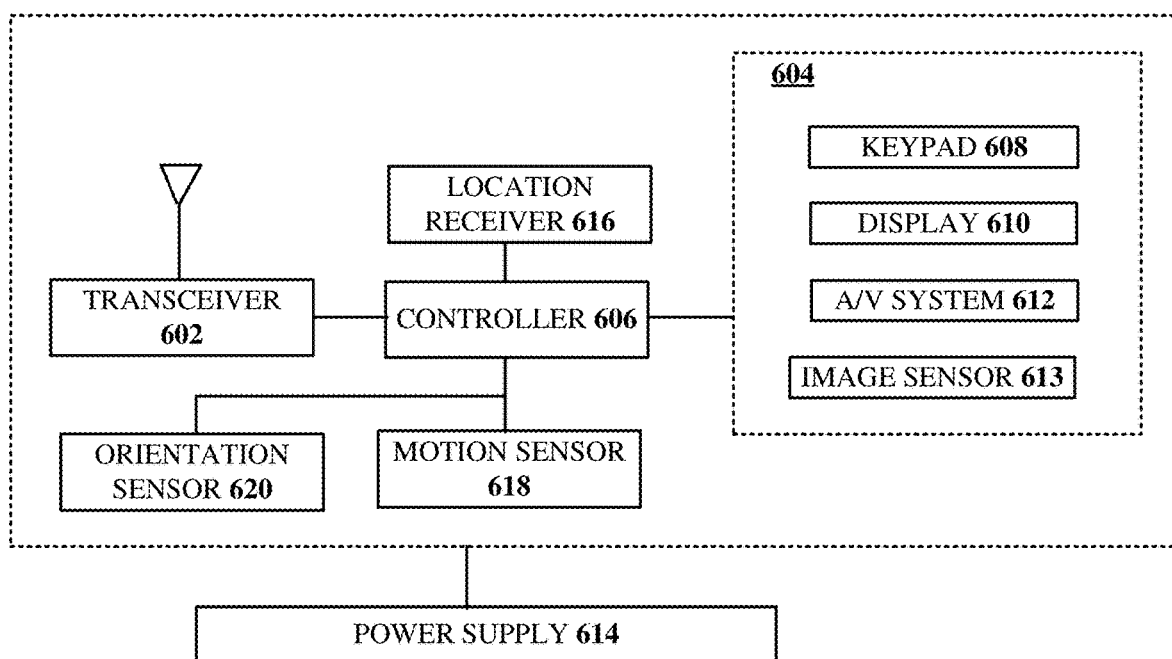
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part computing a capacity for each cell of a plurality of cells associated with a network, responsive to determining that a utilization of wireless spectrum associated with a first plurality of classes of traffic in the network is greater than a first threshold, upgrading a capacity in the network, and responsive to determining that the utilization of the wireless spectrum associated with the first plurality of classes of traffic in the network is less than or equal to the first threshold: computing a capacity for a second plurality of classes of traffic for each cell of the plurality of cells in accordance with the capacity for each cell, performing analytical modeling or engaging a simulation to determine a throughput for each of the second plurality of classes of traffic for each cell of the plurality of cells in accordance with the computing of the capacity for the second plurality of classes of traffic, and responsive to determining that the throughput for at least one of the second plurality of classes of traffic for at least one cell of the plurality of cells is less than a second threshold, upgrading the capacity in the network, wherein the upgrading of the capacity in the network comprises one of: deploying a new cell at a predetermined level of wireless spectrum, wherein the new cell is not included in the plurality of cells, or increasing a wireless spectrum allocation of a first cell of the plurality of cells. Computing device 600 can facilitate in whole or in part responsive to determining that a utilization of wireless spectrum associated with a first class of traffic in a network is greater than a first threshold, performing an upgrade of a capacity in the network, and responsive to determining that the utilization of the wireless spectrum associated with the first class of traffic in the network is less than or equal to the first threshold: computing a capacity for a second class of traffic for each cell of a plurality of cells of the network, performing analytical modeling or engaging a simulation to determine a throughput for the second class of traffic for each cell of the plurality of cells in accordance with the computing of the capacity for the second class of traffic, and responsive to determining that the throughput for the second class of traffic for at least one cell of the plurality of cells is less than a second threshold, performing the upgrade of the capacity in the network, wherein the performing of the upgrade of the capacity in the network comprises one of: deploying a new cell at a predetermined level of wireless spectrum, wherein the new cell is not included in the plurality of cells, or increasing a wireless spectrum allocation of a first cell of the plurality of cells. Computing device 600 can facilitate in whole or in part determining whether a utilization of wireless spectrum associated with a guaranteed class of traffic in a network is greater than a first threshold, responsive to the determining indicating that the utilization of the wireless spectrum associated with the guaranteed class of traffic is greater than the first threshold, causing an upgrade of a capacity in the network, and responsive to the determining indicating that the utilization of the wireless spectrum associated with the guaranteed class of traffic is not greater than the first threshold: determining a throughput for a non-guaranteed class of traffic for each cell of a plurality of cells of the network, and responsive to determining that the throughput for the non-guaranteed class of traffic for at least one cell of the plurality of cells is less than a second threshold, causing the upgrade of the capacity in the network, wherein the causing of the upgrade of the capacity in the network comprises: deploying a new cell at a predetermined level of wireless spectrum, wherein the new cell is not included in the plurality of cells, increasing a wireless spectrum allocation of a first cell of the plurality of cells, or a combination thereof.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
     computing a capacity for each cell of a plurality of cells associated with a network; and
     responsive to determining that a utilization of wireless spectrum associated with a first plurality of classes of traffic in the network is less than or equal to a first threshold:
       computing a capacity for a second plurality of classes of traffic for each cell of the plurality of cells in accordance with the capacity for each cell;
       performing analytical modeling or engaging a simulation to determine a throughput for each of the second plurality of classes of traffic for each cell of the plurality of cells in accordance with the computing of the capacity for the second plurality of classes of traffic; and
       responsive to determining that the throughput for at least one of the second plurality of classes of traffic for at least one cell of the plurality of cells is less than a second threshold, upgrading a capacity in the network,
     wherein the upgrading of the capacity in the network comprises one of:
       deploying a new cell at a predetermined level of wireless spectrum, wherein the new cell is not included in the plurality of cells; or
       increasing a wireless spectrum allocation of a first cell of the plurality of cells.

2. The device of claim 1, wherein the first plurality of classes of traffic include voice over internet protocol (VoIP) traffic, conversational video traffic, or a combination thereof.

3. The device of claim 2, wherein the first plurality of classes of traffic include the VoIP traffic and the conversational video traffic.

4. The device of claim 2, wherein the second plurality of classes of traffic include buffered video traffic, email traffic, text traffic, file transfer traffic, peer-to-peer file sharing traffic, progressive video traffic, interactive gaming traffic, or any combination thereof.

5. The device of claim 1, wherein the computing of the capacity for the second plurality of classes of traffic for each cell of the plurality of cells is further in accordance with a plurality of projections associated with a demand for the first plurality of classes of traffic and a plurality of bandwidths occupied by each session of the first plurality of classes of traffic.

6. The device of claim 1, wherein the upgrading of the capacity in the network further comprises:
   determining that the wireless spectrum allocation of the first cell is less than a third threshold.

7. The device of claim 6, wherein the upgrading of the capacity in the network further comprises:
   responsive to the determining that the wireless spectrum allocation of the first cell is less than the third threshold, performing the increasing of the wireless spectrum allocation of the first cell.

8. The device of claim 1, wherein the upgrading of the capacity in the network further comprises:
   determining that the wireless spectrum allocation of the first cell is greater than a third threshold.

9. The device of claim 8, wherein the upgrading of the capacity in the network further comprises:
   responsive to the determining that the wireless spectrum allocation of the first cell is greater than the third threshold, performing the deploying of the new cell at the predetermined level of wireless spectrum.

10. The device of claim 8, wherein the predetermined level of wireless spectrum is less than the third threshold.

11. The device of claim 1, wherein the performing of the analytical modeling or the engaging of the simulation to determine the throughput for each of the second plurality of classes of traffic for each cell of the plurality of cells comprises the performing of the analytical modeling.

12. The device of claim 11, wherein the analytical modeling is based on an apportionment of a volume of the second plurality of classes of traffic in proportion to a ratio of the capacity for each cell relative to a total capacity for all of the plurality of cells.

13. The device of claim 1, wherein the performing of the analytical modeling or the engaging of the simulation to determine the throughput for each of the second plurality of classes of traffic for each cell of the plurality of cells comprises the engaging of the simulation.

14. The device of claim 13, wherein the engaging of the simulation comprises:
   detecting an event corresponding to an arrival of first traffic associated with the first plurality of classes of traffic, an arrival of second traffic associated with the second plurality of classes of traffic, a departure of third traffic associated with the first plurality of classes of traffic, a departure of fourth traffic associated with the second plurality of classes of traffic, or any combination thereof; and
   responsive to the detecting of the event, recording samples of throughput.

15. The device of claim 14, wherein the engaging of the simulation further comprises:
processing the samples by applying weights to the samples to generate the throughput for each of the second plurality of classes of traffic for each cell of the plurality of cells.

16. The device of claim 14, wherein the event includes the arrival of the first traffic, and wherein the engaging of the simulation further comprises:
determining that blocking is not implemented with respect to the first traffic,
wherein the recording of the samples of throughput is further responsive to the determining that blocking is not implemented with respect to the first traffic.

17. A non-transitory machine-readable medium, comprising executable instructions that, when executed by a processing system including a processor, facilitate performance of operations, the operations comprising:
responsive to determining that a utilization of wireless spectrum associated with a first class of traffic in a network is less than or equal to a first threshold:
computing a capacity for a second class of traffic for each cell of a plurality of cells of the network;
performing analytical modeling or engaging a simulation to determine a throughput for the second class of traffic for each cell of the plurality of cells in accordance with the computing of the capacity for the second class of traffic; and
responsive to determining that the throughput for the second class of traffic for at least one cell of the plurality of cells is less than a second threshold, performing an upgrade of a capacity in the network,
wherein the performing of the upgrade of the capacity in the network comprises one of:
deploying a new cell at a predetermined level of wireless spectrum, wherein the new cell is not included in the plurality of cells; or
increasing a wireless spectrum allocation of a first cell of the plurality of cells.

18. The non-transitory machine-readable medium of claim 17, wherein the first class of traffic comprises conversational voice traffic, conversational video traffic, or a combination thereof.

19. A method, comprising:
determining, by a processing system including a processor, whether a utilization of wireless spectrum associated with a guaranteed class of traffic in a network is greater than a first threshold; and
responsive to the determining indicating that the utilization of the wireless spectrum associated with the guaranteed class of traffic is not greater than the first threshold:
determining, by the processing system, a throughput for a non-guaranteed class of traffic for each cell of a plurality of cells of the network; and
responsive to determining, by the processing system, that the throughput for the non-guaranteed class of traffic for at least one cell of the plurality of cells is less than a second threshold, causing an upgrade of a capacity in the network,
wherein the causing of the upgrade of the capacity in the network comprises one or both of:
deploying a new cell at a predetermined level of wireless spectrum, wherein the new cell is not included in the plurality of cells, and
increasing a wireless spectrum allocation of a first cell of the plurality of cells.

20. The method of claim 19, wherein the causing of the upgrade of the capacity in the network comprises deploying the new cell at the predetermined level of wireless spectrum, and wherein the predetermined level corresponds to a minimum discrete level within the new cell, the method further comprising:
responsive to the determining whether the utilization of wireless spectrum associated with the guaranteed class of traffic in the network is greater than the first threshold indicating that the utilization is greater than the first threshold, causing, by the processing system, the upgrade of the capacity in the network.

* * * * *